US009179265B2

(12) United States Patent
Marti et al.

(10) Patent No.: US 9,179,265 B2
(45) Date of Patent: Nov. 3, 2015

(54) REDUCING LOCATION SEARCH SPACE

(71) Applicant: Apple Inc., Cupertino, CA (US)

(72) Inventors: Lukas M. Marti, Santa Clara, CA (US); Robert Mayor, Half Moon Bay, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 13/756,470

(22) Filed: Jan. 31, 2013

(65) Prior Publication Data

US 2014/0213294 A1 Jul. 31, 2014

(51) Int. Cl.
*H04W 24/00* (2009.01)
*H04W 4/04* (2009.01)
*G01S 5/02* (2010.01)
*H04W 64/00* (2009.01)
*H04W 4/02* (2009.01)

(52) U.S. Cl.
CPC ............... *H04W 4/04* (2013.01); *G01S 5/0236* (2013.01); *G01S 5/0252* (2013.01); *H04W 64/00* (2013.01); *H04W 4/025* (2013.01)

(58) Field of Classification Search
None
See application file for complete search history.

(56) References Cited

U.S. PATENT DOCUMENTS

| 6,393,294 | B1 | 5/2002 | Perez-Breva et al. | |
|---|---|---|---|---|
| 7,433,693 | B2 | 10/2008 | Sheynblat | |
| 8,224,349 | B2 | 7/2012 | Meredith et al. | |
| 2008/0176583 | A1* | 7/2008 | Brachet et al. | 455/456.3 |
| 2014/0094199 | A1* | 4/2014 | Palanki et al. | 455/456.5 |

OTHER PUBLICATIONS

Chen Feng et al: "Received-Signal-Strength-Based Indoor Positioning Using Compressive Sensing", IEEE Transactions on Mobile Computing, IEEE Service Center, Los Alamitos, CA, US, vol. 11, No. 12, Dec. 1, 2012, pp. 1983-1993, XP011470186, ISSN: 1536-1233, DOI: 10.1109/TMC.2011.216.
Chen Feng et al: "Compressive Sensing Based Positioning Using RSS of WLAN Access Points", INFOCOM, 2010 Proceedings IEEE, IEEE, Piscataway, NJ, USA, Mar. 14, 2010, pp. 1-9, XP031674868, ISBN: 978-1-4244-5836-3.
Christof Rohrig et al: "Estimation of position and orientation of mobile systems in a wireless LAN", Proceedings of the 46th IEEE Conference on Decision and Control : New Orleans, LA, Dec. 12-14, 2007, IEEE, Piscataway, NJ, USA, Dec. 1, 2007, pp. 4932-4937, XP031204953, ISBN: 978-1-4244-1497-0.
Huseth, S.;Kolavennu,S.: "Localization in Wireless Sensors Networks" In: Mazumder, S.K.: "Wireless Networking Based Control", Dec. 3, 2010, Springer, New York ISBN: 1441973923, pp. 158-159.

(Continued)

*Primary Examiner* — Erika A Washington
(74) *Attorney, Agent, or Firm* — Fish & Richardson P.C.

(57) ABSTRACT

Methods, program products, and systems for reducing a location search space are described. A mobile device, when arriving at a venue, can determine a location of the mobile device using signals from one or more signal sources associated with the venue. The mobile device can use a coarse location estimator to estimate a coarse location of the mobile device at the venue. The mobile device can request, from a server, detailed location data associated with the coarse location. The detailed location data can include location fingerprint data associated with a portion of the venue that includes the coarse location. The mobile device can determine an estimated location that has finer granularity than the coarse location using the location fingerprint data.

22 Claims, 12 Drawing Sheets

(56) References Cited

OTHER PUBLICATIONS

Youngjune Gwon et al: "Error characteristics and calibration free techniques for wireless LAN-based location estimation". Proceedings of the second international workshop on Mobility management & wireless access protocols, MobiWac '04, Jan. 1, 2004, p. 2, XP55127472, New York, New York, USA, DOI: 10.1145/1023783.1023786 ISBN: 978-1-58-113920-4.

International Search Report and Written Opinion of the International Searching Authority, PCT Application Serial No. PCT/US2014/011922, Jul. 21, 2015, 12 pages.

* cited by examiner

REDUCING LOCATION SEARCH SPACE

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to accurately determine a location using the GPS functions of the mobile device. In addition, the mobile device may not be able to determine its location using other conventional technologies (e.g., dead reckoning). For example, a mobile device may have been turned off and have traveled a long distance while turned off (e.g., in an airplane). As a result, the mobile device may not have a starting point for dead reckoning. When the mobile device is turned back on again (e.g., when the mobile device leaves the airplane and enters an airport building), satellite signals may be unavailable. Lacking GPS signals and a starting location, the mobile device can use neither GPS functions nor dead reckoning to determine a location when in the airport building. Meanwhile, a user of the mobile device may wish to know where in the airport building the user is located. The user may wish to know the location as quickly as possible, using the mobile device.

SUMMARY

Methods, program products, and systems for reducing a location search space are described. A mobile device, when arriving at a venue, can determine a location of the mobile device using signals from one or more signal sources associated with the venue. The mobile device can use a coarse location estimator to estimate a coarse location of the mobile device at the venue. The mobile device can request, from a server, detailed location data associated with the coarse location. The detailed location data can include location fingerprint data associated with a portion of the venue that includes the coarse location. The mobile device can determine an estimated location that has finer granularity than the coarse location using the location fingerprint data.

In general, in one aspect, a server can store coarse location data and location fingerprint data. The coarse location data can include estimated locations of one or more signal sources. The location fingerprint data can include expected measurements of signal from the one or more signal sources. The server can receive a request for coarse location data from a mobile device. The request can be associated with an identifier of each of the one or more signal sources. The server can provide the coarse location data to the mobile device. The server can then receive a request for location fingerprint data from the mobile device. The request for location fingerprint data from the mobile device can indicate a coarse location as estimated by the mobile device using the coarse location data. In response, the server can provide the location fingerprint data associated with an area that includes the coarse location to the mobile device for determining an estimated location of the mobile device.

In general, in one aspect, a server can receive survey data from a sampling device. The survey data can include measurements of signals of one or more signal sources as detected by the sampling device when the sampling device is located at a venue. The server can generate coarse location data and location fingerprint data based on received survey data. The coarse location data and location fingerprint data can be associated with the venue. When the server receives a request for location fingerprint data including a coarse location, the server can send a portion of the location fingerprint data that includes the coarse location in response.

The features described in this specification can be implemented to achieve the following advantages. Compared to a conventional mobile device having GPS functions and conventional dead reckoning functions, a mobile device implementing features described in this specification can provide a location estimate when GPS signals and dead reckoning are unavailable. Accordingly, for example, a user entering an airport building from an airplane can know the user's location in the airport building using the mobile device.

The location estimation can be fast. A location fingerprint database can be large for a large building (e.g., an airport building) when many signal sources can be detected in the large building. A mobile device implementing features described in this specification can quickly determine a location of the mobile device in two stages. In a first stage, the mobile device can determine that the mobile device is located at a coarse location in a particular portion of the building, and then request downloading only location fingerprint data relevant to that portion of the building. Accordingly, the download data size will be smaller than when downloading location fingerprint data for the entire venue. Downloading speed can be faster, and bandwidth usage will be smaller.

In addition, the mobile device typically can detect fewer signal sources in portion of venue than all signal sources in the venue. Accordingly, a search space in which the mobile device determines a location is smaller. When the mobile device determines the location using the location fingerprint data in the second stage of location determination, the mobile device can determine a precise location using the fingerprint data. In the second stage, the mobile device may perform fewer calculations including statistical classification using the location fingerprint data than a conventional device. Accordingly, location determination can be faster, giving a user a better experience.

The details of one or more implementations of reducing a location search space are set forth in the accompanying drawings and the description below. Other features, aspects, and advantages of reducing a location search space will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
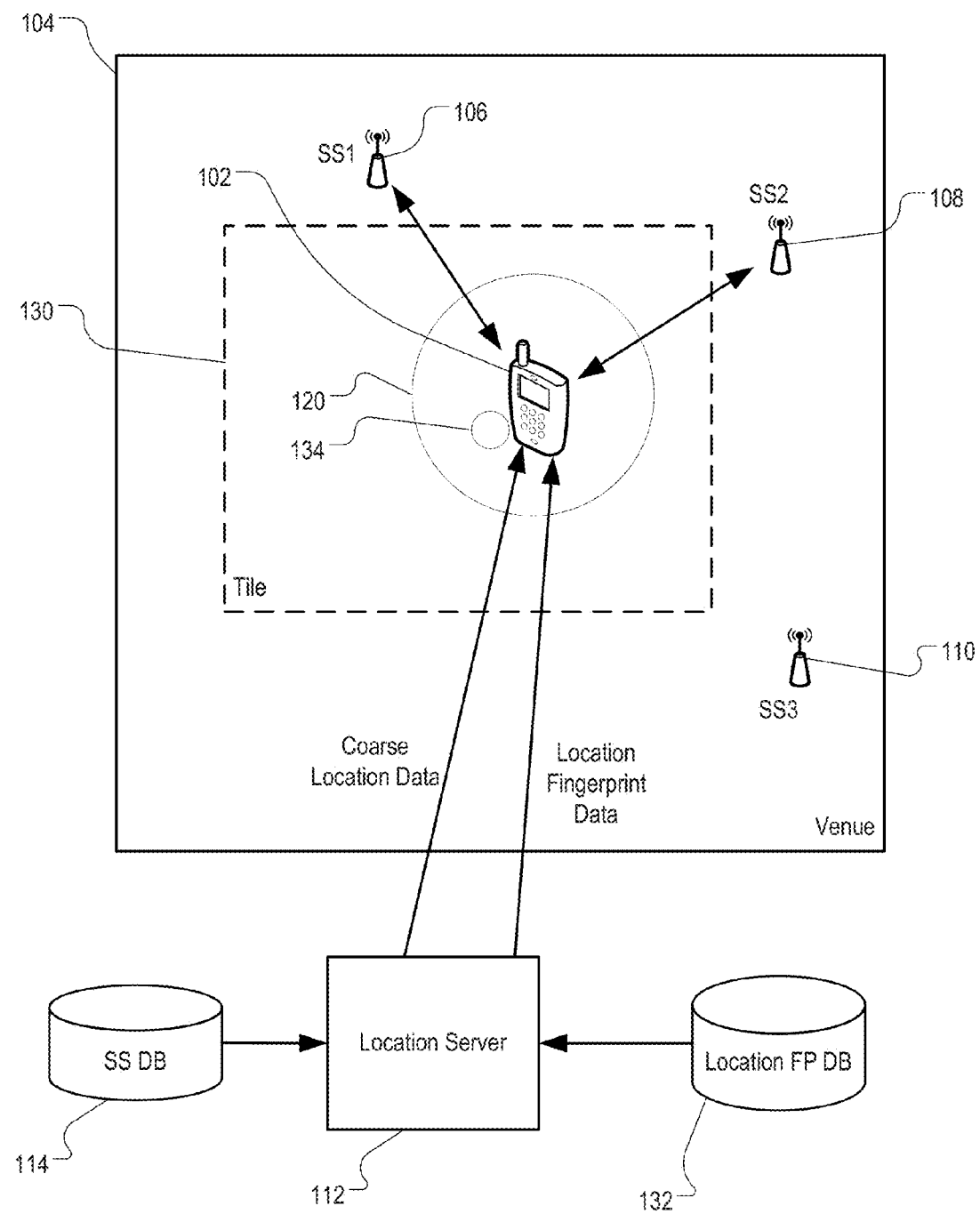
FIG. 1 is a diagram providing an overview of reducing a location search space.

FIG. 1 is a diagram providing an overview of reducing a location search space. Mobile device 102 can be a device implementing features described in this specification. Mobile device 102 can be located at venue 104. Venue 104 can be a large building, where inside venue 104, signals from a global satellite system (e.g., GPS) are obstructed or otherwise interfered with. When located at venue 104, mobile device 102 seeks to determine an estimated location using techniques other than GPS.

Mobile device 102 may not have prior knowledge where mobile device 102 is located. For example, mobile device 102 may have travelled a long distance (e.g., on an airplane), entered venue 104, and been turned on. Mobile device 102 can detect one or more signal sources, e.g., signal sources 106, 108, and 110. Each of signal sources 106, 108, and 110 can be a source of a radio frequency (RF) signal, e.g., a wireless access point of a wireless network. Mobile device 102 can determine a coarse location of mobile device 102 using the signal sources. The coarse location can be a rough location estimate having high uncertainty and low accuracy. To determine the coarse location, mobile device 102 can submit a request for locations services to location server 112. The request can be a request for coarse location data for determining the coarse location. The request for coarse location data can include identifiers of detected signal sources 106, 108, and 110. The identifiers can be, for example, media access control (MAC) addresses of signal sources 106, 108, and 110.

Location server 112 can be one or more computers configured to provide location services to mobile devices. Upon receiving the request for coarse location data, location server 112 can determine that the identifiers of detected signal sources 106, 108, and 110 are associated with venue 104 according to signal source location database 114. Signal source location database 114 can store representations of signal sources 106, 108, and 110, and an identifier of venue 104 associated with signal sources 106, 108, and 110. Signal source location database 114 can be part of location server 112, or be connected to location server 112 through a network. In signal source location database 114, each of signal sources 106, 108, and 110 can be associated with a signal source location.

The signal source location may or may not correspond to a physical location of the corresponding signal source. Each signal source location can be associated with signal sources 106, 108, and 110 using surveys already performed by a sampling device. The surveying techniques will be described below in reference to FIG. 4. In some implementations, the signal source location of each of signal sources 106, 108, and 110 can be an actual or estimated location of the corresponding signal source relative to venue 104, e.g., X meters south and Y meters west of a reference point in venue 104. In some implementations, the signal source locations can each include a latitude coordinate, a longitude coordinate, and an altitude coordinate. The signal source locations of signal sources 106, 108, and 110 can each be associated with an uncertainty value. The uncertainty value can indicate a confidence of the signal source location or an error margin of the signal source location.

Location server 112 can provide coarse location data to mobile device 102. The coarse location data can include signal source locations of signal sources 106, 108, and 110, as well as signal source locations of other signal sources associated with venue 104. A signal source can be associated with venue 104 when signal from the signal source are estimated to be detectable by a mobile device located at venue 104.

Upon receiving the coarse location data, mobile device 102 can determine coarse location 120 of mobile device 102. Mobile device 102 can determine coarse location 120 using a weighted average of signal source locations of signal sources 106, 108, and 110. The weights in the weighted average can correspond to measurements of the signals from signal sources 106, 108, and 110. For example, the weighted average can be a function of an RSSI of signals from each of signal sources 106, 108, and 110, and the uncertainty value of each of signal sources 106, 108, and 110. Mobile device 102 can submit coarse location 120 to location server 112. Mobile device 102 can submit coarse location 120 as a request for location fingerprint data. More details on location fingerprint data will be described below in reference to FIG. 3.

Upon receiving the request for location fingerprint data from mobile device 102, location server 112 can determine one or more tiles, e.g., tile 130, the location fingerprint data of which will be send to mobile device 102. Location server 112 can identify tile 130 from location fingerprint database 132. Location fingerprint database 132 can store location fingerprint data associated with venue 104. Location fingerprint database 132 can be a database that is a part of location server 112 or be connected to location server 112 through a network. The location fingerprint data can include expected measurements of signal sources associated with multiple locations at venue 104. Mobile device 102 can determine a location of mobile device 102 using statistical classification based on the location fingerprint data. When venue 104 is a large building, many signal sources can be detected in various parts of the building. A search space for statistical classification can be large, e.g., can involve all the signal sources. Performing statistical classification on a large search space can be resource intensive operations.

Location server 112 can divide venue 104 into multiple tiles. Each tile can include a portion of venue 104 and have a portion of the signal sources detectable in the portion of venue 104. In statistical classification, each tile can correspond to a smaller search space than the search space for the entire venue 104. Tiles can overlap.

Upon receiving the request for location fingerprint data from mobile device 102, location server 112 can identify tile 130 that encloses coarse location 120. Tile 130 can correspond to location fingerprint data that includes expected measurement vectors for signal sources 106, 108, and 110, as well as expected measurement vectors for other signal sources. Location server 112 can submit the location fingerprint data of tile 130 to mobile device 102.

Mobile device 102, upon receiving the location fingerprint data of tile 130, can perform statistical classification of measurements of signals of signal sources 106, 108, and 110 using the location fingerprint data associated with tile 130. Mobile device 102 can determine estimated location 134 of mobile device 102 based on a result of the statistical classification. The location fingerprint data of tile 130 can have a smaller search space than the search space for entire venue 104. Accordingly, mobile device 102 can determine estimated location 134 more efficiently than determining estimated location 134 by performing statistical classification on all location fingerprint data associated with venue 104. The estimated location can be a venue location that is relative to a reference point in the venue and sufficiently accurate (e.g., to within a few meters) to tell a user of mobile device 102 where in venue 104 the user is located.

Figure 2:
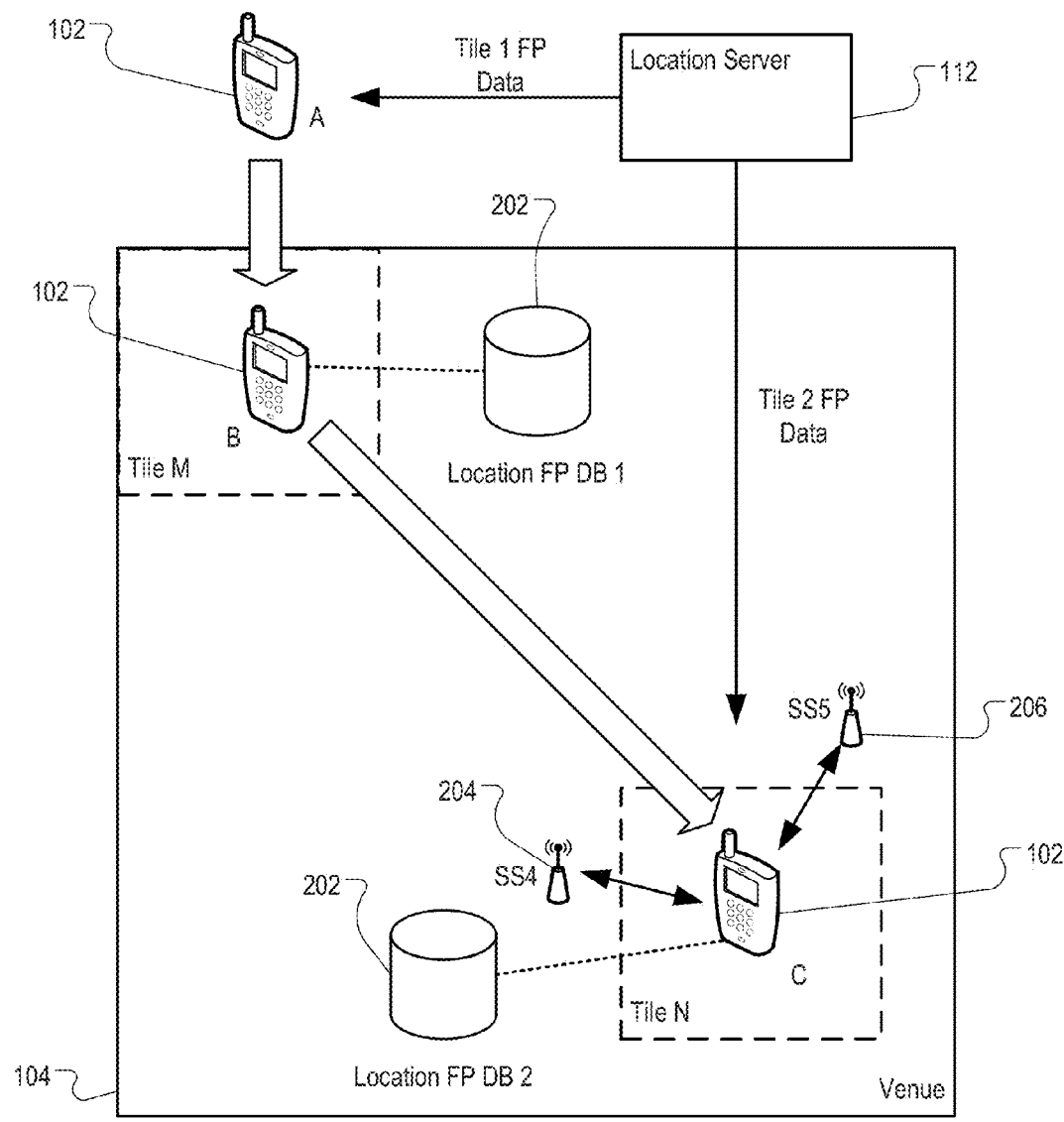
FIG. 2 is a diagram illustrating techniques of managing an a priori search space.

FIG. 2 is a diagram illustrating techniques of managing an a priori search space. Mobile device 102 can be at location A and move towards venue 104. While approaching venue 104, mobile device 102 may determine an estimated location and an estimated heading of mobile device 102 using a location subsystem of mobile device 102 (e.g., a GPS subsystem). Base on the estimated location and the estimated heading, mobile device 102 can recognize that mobile device 102 is approaching venue 104. Mobile device 102 can request location fingerprint data from location server 112. The request can include the estimated location (location A) and the estimated heading.

Based on the estimated location (location A) and estimated heading, location server can provide tile M fingerprint data to mobile device 102. Tile M fingerprint data can correspond to a portion of venue 104 that mobile device 102 is expected to enter, e.g., a lobby area of an office building, or a check in area of an airport building. Mobile device 102 can store the tile M fingerprint data locally in location fingerprint database 202 of mobile device 102. When mobile device 102 is at venue 104, e.g., at location B that is enclosed by tile M, mobile device 102 can determine an estimated location using the tile M fingerprint data.

Mobile device 102 can move from location B to location C. During the move, mobile device 102 may be turned off such that a path from location B to location C is unknown to mobile device 102. Mobile device 102 can be turned on again at location C. Mobile device 102 can detect signal sources 204 and 206 after being turned on. Mobile device 102 can determine that signal sources 204 and 206 are not present in the tile M fingerprint data. Upon the determination, mobile device 102 can submit a request for coarse location data to location server 112. In response, location server 112 can provide coarse location data to mobile device 102. In some implementations, location server 112 can provide the coarse location data to mobile device 102 along with tile M fingerprint data, such that mobile device 102 does not need to request coarse location data later. Mobile device 102 can store the coarse location data indefinitely, or until mobile device 102 leaves venue 104.

Mobile device 102 can then determine a coarse location, and submit the coarse location to location server 112. In response, location server 112 can send tile N fingerprint data to mobile device 102, where tile N encloses the coarse location. Mobile device 102 can store tile N fingerprint data in location fingerprint database 202. Mobile device 102 can then determine an estimated location of mobile device 102 using statistical classification based on the tile N fingerprint data.

Exemplary Location Fingerprint Data

Figure 3:
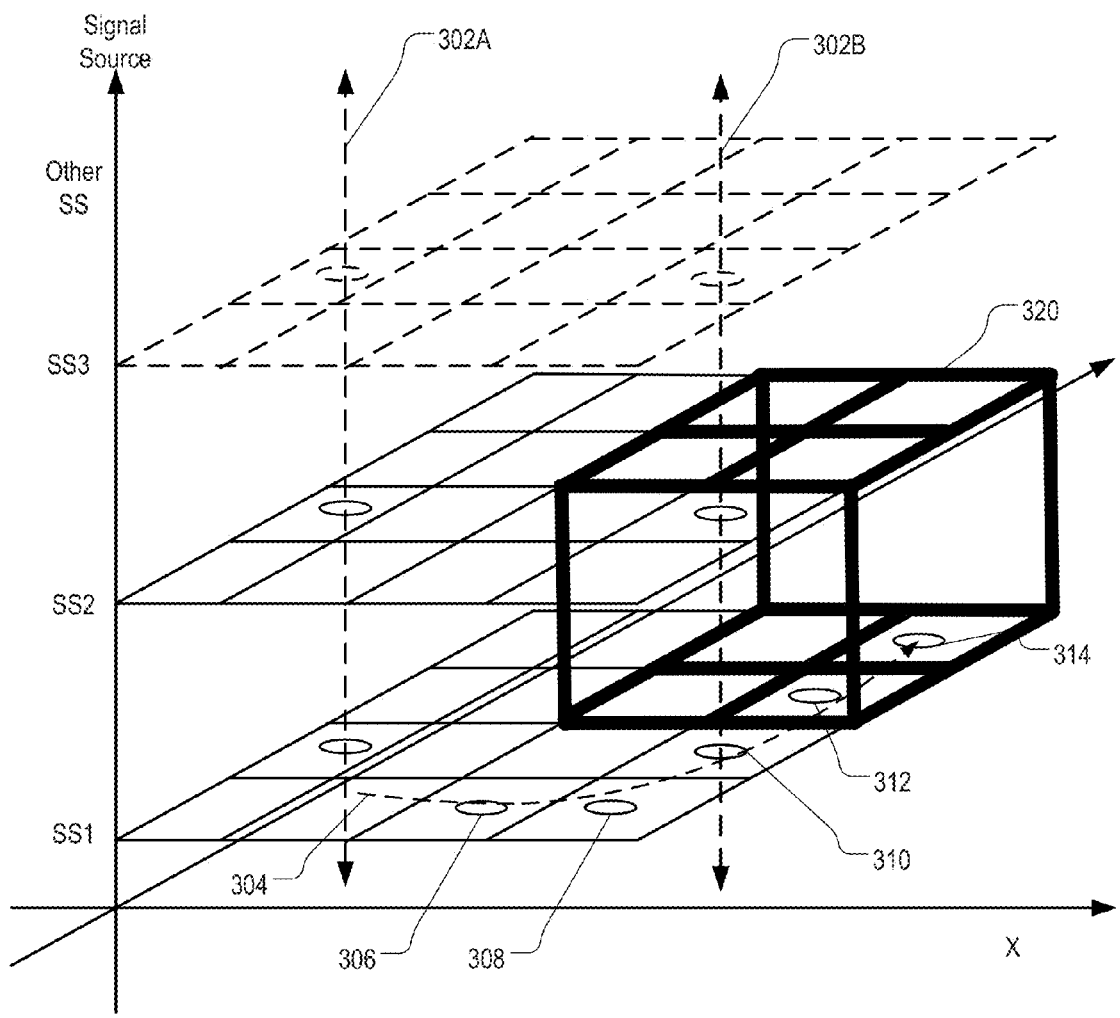
FIG. 3 illustrates an exemplary logical structure of a location fingerprint database.

FIG. 3 illustrates an exemplary logical structure of location fingerprint data. The location fingerprint data can be generated by location server 112, and stored in location fingerprint database 132 of FIG. 1. The location fingerprint data, after being provided to mobile device 102, can be stored in location fingerprint database 202. The exemplary logical structure illustrated in FIG. 3 can correspond to a portion of the location fingerprint database, e.g., the portion that corresponds to venue 104.

Location fingerprint data can include, for each location among multiple locations in a venue (e.g., venue 104 of FIG. 1), a measurement vector. A measurement vector can include expected measurements of the signal sources at the location, variance of the expected measurements at the location, and weights of the expected measurements at the location. The expected measurements can include measurements a mobile device, if located at the corresponding location, is expected to take. The variance can include a range of values of the expected measurements, and a probability that the measurements have each value. The weights can indicate how much weight the mobile device is going to apply to the corresponding expected measurements in statistical classification. The weight of a given signal source can correspond to a probability that a mobile device can detect the signal from the signal source.

The expected measurements can correspond to more than one type of signal sources. For example, location fingerprint data can include at least one of: wireless access point fingerprint data; radio frequency identification (RFID) fingerprint data; near field communication (NFC) fingerprint data; Bluetooth™ fingerprint data; magnetic field fingerprint data; cellular fingerprint data; or computer vision fingerprint data. The various fingerprint data can be aggregated to form the location fingerprint data for a given venue or a given location at the venue. The various fingerprint data can include, for example, a received signal strength indication (RSSI), a round trip time, a magnetic field strength and direction.

Location fingerprint data can be stored as multi-dimensional data in association with a venue. Some of the dimensions of the multi-dimensional data can be space dimensions. The space dimensions can include X (e.g., latitude), Y (e.g., longitude), and Z (e.g., altitude, not shown). The space dimension can be continuous, expressed in a function, or discrete, where the space dimension can include locations distributed in the venue. The distribution can be even and uniform, or concentrated around areas where good measurements (e.g., strong signals or strong contrast between a first signal and a second signal) exist.

At least one dimension of the multi-dimensional data can be a signal source dimension. Location fingerprint data can include multiple measurement vectors, each measurement vector corresponding to a location in the venue. Measurement vector 302A can correspond to a location represented by (X1, Y1, Z1), and have one or more values of each signal source at location (X1, Y1, Z1). Likewise, measurement vector 302B can correspond to a location represented by (X2, Y2, Z2), and have one or more values of each signal source at location (X2, Y2, Z2). The values can include one or more of an expected value of an environment variable (e.g., an expected RSSI), a variance of the expected value, or the weight. Location server 112 can determine the expected measurement and variance based on measurements and variance of the measurements received from a sampling device. The sampling device can be a mobile device configured to detect signals from signal sources at multiple locations in the venue when the mobile device moves in the venue.

In some implementations, the space dimension can be normalized. Each measurement received from a sampling device can correspond to a sampling point. For example, a surveyor can carry the sampling device and follow path 304 to survey a venue. Location server 112 can determine a location grid, and normalize path 304 to locations 306, 308 310, 312, and 314 according to distribution of locations 306, 308 310, 312, and 314. More details on obtaining measurement using survey by sampling device will be described below in reference to FIG. 4.

The entire search space for venue 104 can include all the signal sources (e.g., SS1, SS2, and SS3) and all sample points, as well as location in venue 104 that are not sampled where the expected measurements are determined by interpolation or extrapolation. The search space can be reduced when a coarse location is known. Reduced search space 320 can include a portion of the signal sources, e.g., SS1 and SS2, and a portion of all sample locations and locations. Reduced search space 320 can include the portion of the signal sources and portion of sample locations associated with one or more tiles (e.g., tile 130 of FIG. 1). A mobile device can determine a location by performing statistical classification of signal measurements in reduced search space 320.

Exemplary Surveying Techniques

Figure 4:
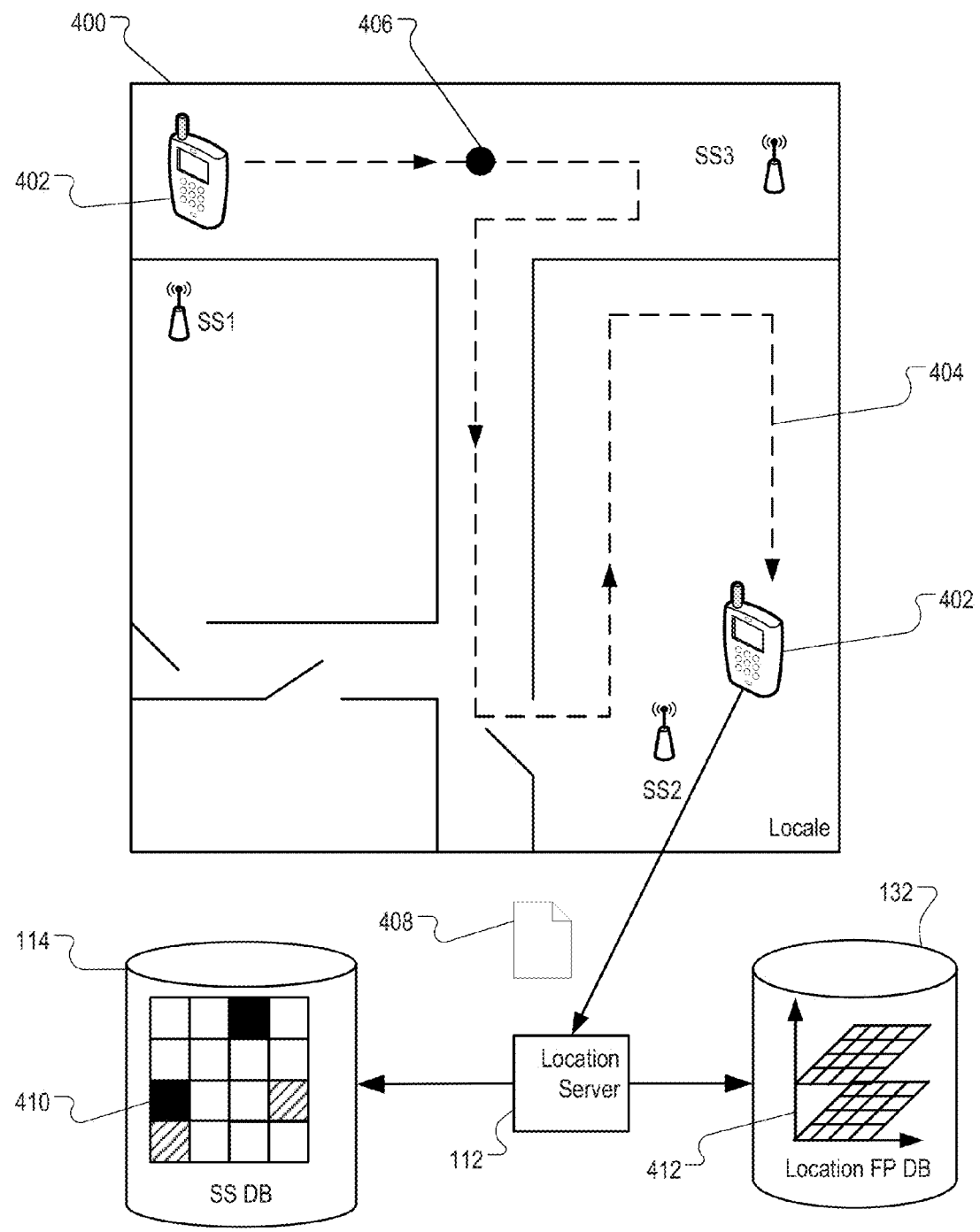
FIG. 4 is a diagram illustrating exemplary techniques for generating survey data by a mobile device.

FIG. 4 is a diagram illustrating exemplary techniques for generating survey data by a mobile device. In a survey, sampling device 402 can measure signals from one or more signal sources and submit the measurements to location server 112 for processing. Sampling device 402 can survey locale 400, which can be a portion of venue 104 of FIG. 1. Sampling device 402 can be mobile device 102 of FIG. 1, or another mobile device designated to survey locale 400.

Surveying locale 400 can include measuring one or more environment variables using a sensor or receiver of sampling device 402. Each environment variable can correspond to a signal from a signal source. Each environment variable can be natural or artificial. For example, an environment variable can be a radio signal, magnetic field intensity or direction, a temperature, a sound level, a light intensity or color, or air pressure. The environment variables can include signals from signal sources SS1, SS2, and SS3. Signal sources SS1, SS2, and SS3 can transmit signals that are detectable by sampling device 402 at locale 400. Physically, signal sources SS1, SS2, and SS3 may be located inside or outside of locale 400.

Sampling device 402 can be carried by a surveyor to various sampling points in locale 400. The surveyor can be a person or a device that can physically move to various locations inside of venue 104. Sampling device 402 can determine the sampling points based on a user input on a map of locale 400 displayed on sampling device 402. The sampling points can be along sampling path 404. In some implementations, sampling path 404 can be a path provided to sampling device 402 by location server 112. For example, location server 112 can provide a map of locale 400 to mobile device 102 for display, and provide the sampling path 404 to mobile device 102 for overlaying on the map. Location server 112 (or sampling device 402) can instruct the surveyor to take measurements at one or more sampling points, e.g., sampling point 406, along sampling path 404. In some implementations, sampling path 404 can be an ad hoc path. A surveyor can walk to various locations in locale 400 and take a measurement at each location. Sampling path 404 can be constructed based on time and location sequence of the various locations.

At each sampling point, sampling device 402 can record a sensor or receiver reading measuring signals from one or more signal sources. For example, if signal sources SS1, SS2, and SS3 are RF transmitters, e.g., wireless access points, sampling device 402 can record measurements of signals from signal sources SS1, SS2, and SS3 when sampling device 402 can detect a signal from the respective wireless access point. The recorded measurements can include a service set identification (SSID) or MAC address received from each of the wireless access points, and RSSI from each wireless access point. Sampling device 402 can designate the sampled information at each sampling point measurements of the sampling point. At each sampling point, sampling device 402 need not detect signals from all signal sources to generate the measurements for a sampling point. Sampling device 402 can send the measurements to location server 112 as survey data 408 for additional processing.

Based on survey data 408 received from sampling device 402, location server 112 can generate signal source data 410 and location fingerprint data 412. Location server 112 can store signal source data 410 and location fingerprint data 412 in signal source location database 114 and location fingerprint database 132, respectively.

Location server 112 can generate signal source data 410 by applying a first and second moment estimation to survey data 408. More details of generating signal source data 410 are described in patent application Ser. No. 13/153,069 "Location Estimation Using a Probability Density Function, the entire content of which is incorporated herein by reference.

Location fingerprint data 412 can include measurement vectors based on the measurements in survey data 408 received from sampling device 402. In some implementations, location server 112 can determine the measurement vectors, including measurement vectors 302A and 302B of FIG. 3, using interpolation from the measurements in survey data 408. In some implementations, location server 112 can determine some or all measurement vectors, including measurement vectors 302A and 302B, using prediction. Predication can include extrapolation using truth data on signal sources. The truth data can include known locations of the signal sources at locale 400, e.g., exact location of signal sources SS1, SS2, and SS3 as provided in reference to a map of locale 400.

Location server 112 can obtain the variance of the expect measurements based on difference in the measurements in survey data 408. Location server 112 can determine feature vectors that include weights of each signal source at multiple locations. Location server 112 can determine the feature vectors based on, for example, strength of a signal from each signal source as surveyed at each sampling point at the venue, where a stronger signal is associated with a higher weight.

Feeding an a Priori Search Space by a Coarse Location Estimator

Figure 5:
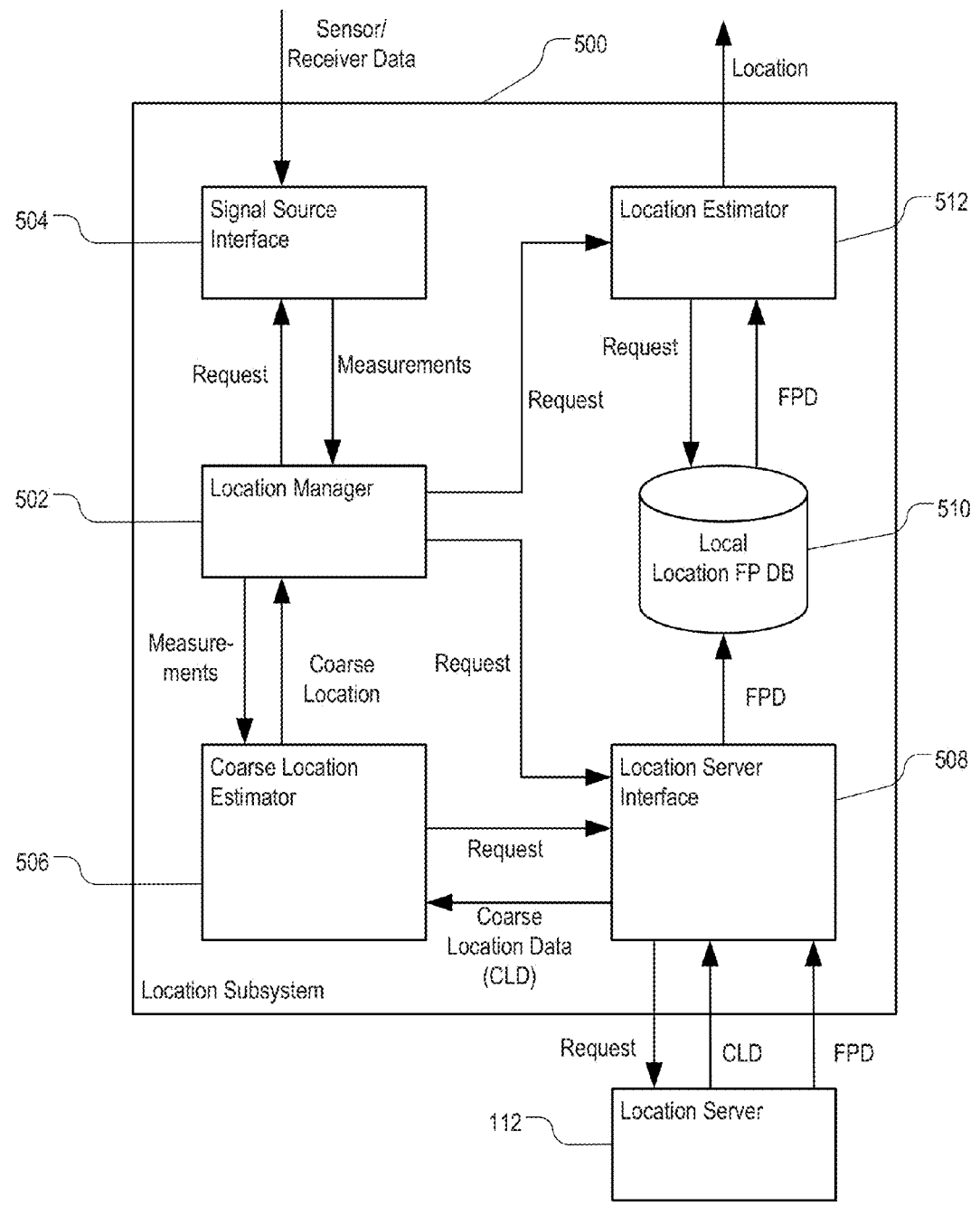
FIG. 5 is a block diagram illustrating components of an exemplary location subsystem of a mobile device.

FIG. 5 is a block diagram illustrating components of exemplary location subsystem 500 of mobile device 102. Location subsystem 500 can include hardware or software components for reducing a search space in location determination and determining an estimated location of mobile device 102 using the reduced search space.

Location subsystem 500 can include location manager 502. Location manager 502 is a component of location subsystem 500 configured to manage location determination functions. When signals from a global satellite system (e.g., GPS) are available, location manager 502 can determine a location of mobile device 102 using the signals from the global satellite system. When signals from a global satellite system are unavailable, location manager 502 can request signal source interface 504 to provide one or more measurements of signals received from signal sources by one or more sensors or receivers of mobile device 102.

Signal source interface 504 can be a component of location subsystem 500 configured to interface with the one or more sensors or receivers of mobile device 102 and provide measurements of the signals and identifiers of the signal sources to location manager 502. The measurements can include, for example, an RSSI or a round-trip time when signal sources 106, 108, and 110 are wireless access points, a temperature when signal sources 106, 108, and 110 are heat sources, a sound pressure level when signal sources 106, 108, and 110 are sound sources, a light intensity or spectrum when signal sources 106, 108, and 110 are light sources.

Upon receiving the measurements from signal source interface 504, location manager 502 can provide the received measurements and identifiers to coarse location estimator 506. Coarse location estimator 506 is a component of location subsystem 500 configured to determine a coarse location of mobile device 102. Coarse location estimator 506 can submit the identifiers of the signal sources to location server interface 508 in a request for coarse location data.

Location server interface 508 is a component of location subsystem 500 configured to send location data requests to location server 112 and receive location data from location server 112. Upon receiving the request for coarse location data, location server interface 508 can submit the request to location server 112 and receive coarse location data in response. The coarse location data can include signal source locations of the signal sources identified by the identifiers. Location server interface 508 can submit the coarse location data to coarse location estimator 506.

Upon receiving the coarse location data, coarse location estimator 506 can determine a coarse location of mobile device 102 based on the measurements received from location manager 502 and the coarse location data. The coarse location can be associated with an a priori uncertainty value indicating an error margin of the coarse location. Coarse location estimator 506 can submit the coarse location and the associated a priori uncertainty value to location manager 502. Location manager 502 can submit the coarse location to location server interface 508 in a request for location fingerprint data. Location server interface 508 can submit the request to location server 112 as a second request. Location server 112 can retrieve location fingerprint data based on the coarse location and provide the location fingerprint data to location server interface 508. Location server interface 508 can store the received location fingerprint data in local location fingerprint database 510. Local location fingerprint database 510 can be a component of location subsystem 500 configured to store location fingerprint data on mobile device 102.

Location manager 502 can request location estimator 512 to determine an estimated location of mobile device 102. The request can include the a priori uncertainty value as determined by coarse location estimator 506 and measurements provided by signal source interface 504. Location estimator 512 is a component of location subsystem configured to determine the estimated location by performing statistical classification of the measurement using location fingerprint data. Location estimator 512 can request the location fingerprint data, and perform the statistical classification of the measurements based on the a priori uncertainty value. Location estimator 512 can provide the estimated location resulting from the statistical classification as an output of location subsystem 500. Mobile device 102 can provide the output for display on a display device, or use the output to drive location based application programs or system services.

Figure 6:
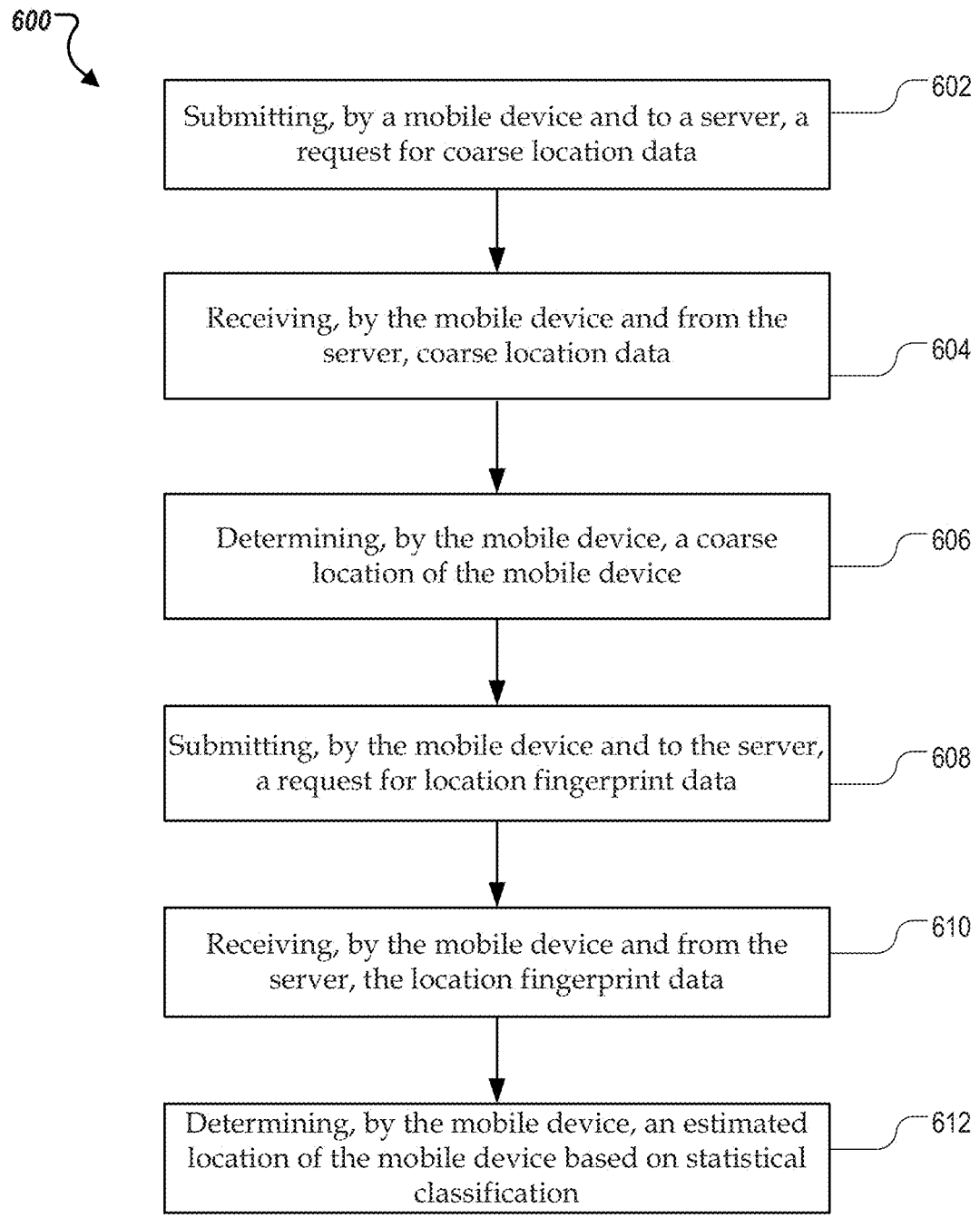
FIG. 6 is a flowchart of an exemplary procedure of reducing a location search space performed by a mobile device.

FIG. 6 is a flowchart of exemplary procedure 600 of reducing a location search space performed by mobile device 102. Mobile device 102 can submit (602), to a server (e.g., location server 112), a request for coarse location data. The request for coarse location data can include an identifier of each of one or more signal sources detected by mobile device 102. Submitting the request for coarse location data can be triggered by a location request for an estimated location of mobile device 102 received by mobile device 102 from a user or an application program. Another trigger for submitting the request for coarse location data can be that, when mobile device 102 receives the location request, mobile device 102 cannot detect GPS signals.

Mobile device 102 can receive (604), from the server, coarse location data. The coarse location data can include an actual or estimated location of each signal source. The estimated location of each signal source can be determined based on a multi-modal probability function applied to survey data. The survey data can be provided by a sampling device (e.g., sampling device 402) measuring signals from the signal source at a venue. The estimated location can be associated with a signal source uncertainty value.

Mobile device 102 can determine (606) a coarse location of mobile device 102 based on a measurement of signals from the one or more signal sources and a function of the signal source uncertainty and the measurement. The function can be a weighted average of measurements. For example, each signal source can be an RF signal transmitter, e.g., a wireless access point. The measurements can be signal strengths (e.g., RSSI), a round-trip time, or a combination of the two. The weight can be the measurements and the uncertainty value.

Mobile device 102 can submit (608), to the server, a request for location fingerprint data. The request for location fingerprint data can identify the coarse location.

Mobile device 102 can receive (610), from the server, the location fingerprint data associated with at least of a portion of a venue that includes the coarse location. The location fingerprint data can include expected measurements of signal of each signal source. The location fingerprint data can include training data generated based on one or more previously conducted surveys of the venue. The training data can be used in statistical classification.

Mobile device 102 can determine (612) an estimated location of mobile device 102 based on statistical classification of a measurement vector using the location fingerprint data. The measurement vector can include a measurement of the signals from each signal source. Mobile device can provide the estimated location as a response to the location request that triggered submission of the request for coarse location data.

Exemplary Location Server

Figure 7:
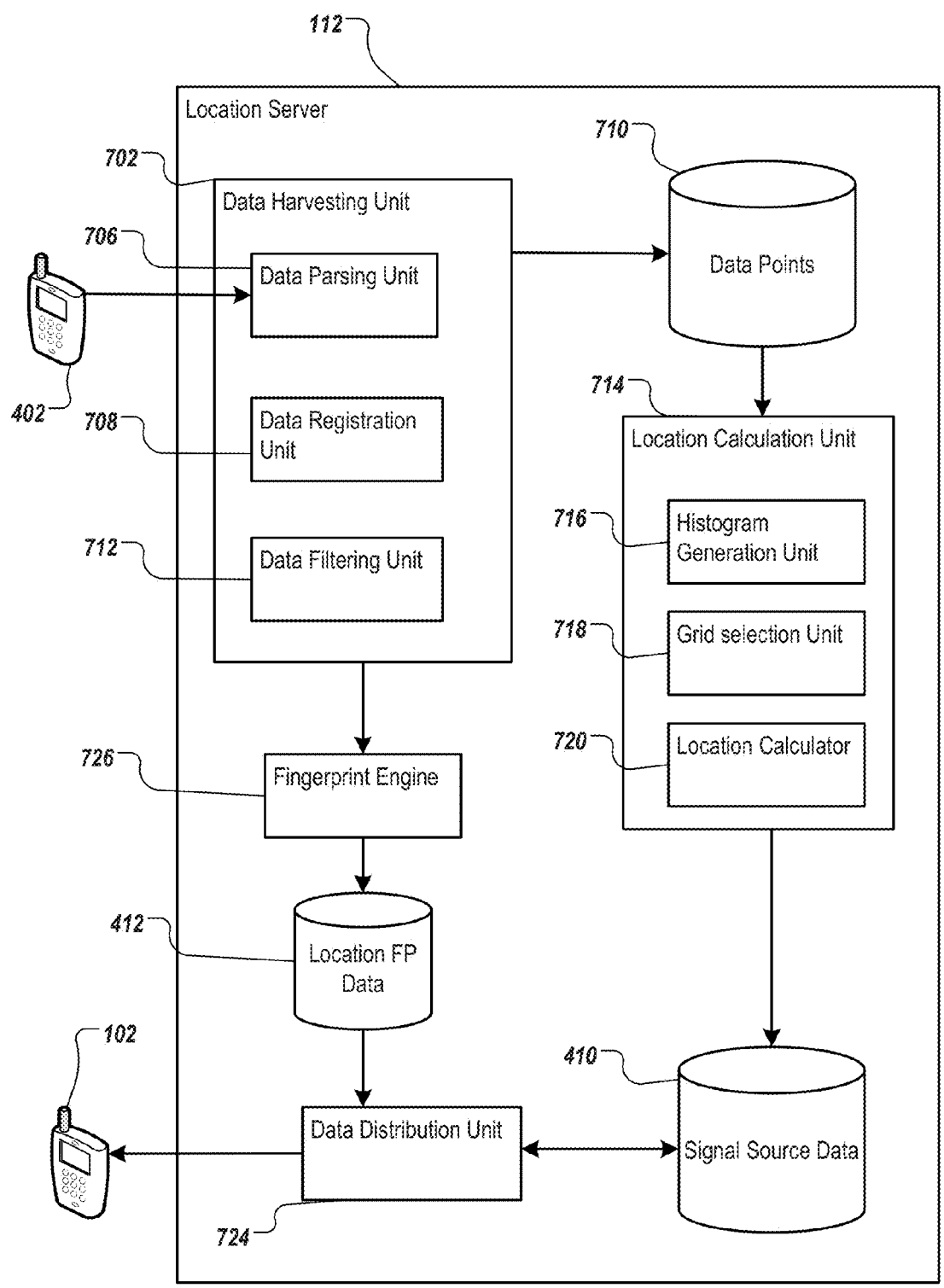
FIG. 7 is a block diagram illustrating components of an exemplary location estimation system configured to generate coarse location data and location fingerprint data.

FIG. 7 is a block diagram illustrating components of exemplary location server 112 configured to generate coarse location data and location fingerprint data, and to provide the coarse location data and location fingerprint data to a mobile device.

Location server 112 can include data harvesting unit 702. Data harvesting unit 702 is a component of location server 112 that is programmed to receive and process survey data from one or more mobile devices (e.g., sampling device 402). Data harvesting unit 702 can include data parsing unit 706. Data parsing unit 706 is a component of data harvesting unit 702 that is configured to receive the raw data from the one or more mobile devices (e.g., sampling device 402), parse the data fields of the raw data, and generate structured data, e.g., name-value pairs that match identifier of a signal source to a measurement of signals from that signal source and venue-name pairs that match signal sources to a venue. The identifier can be a MAC address of a signal source.

Data harvesting unit 702 can include data registration unit 708. Data registration unit 708 is a component of data harvesting unit 702 that is configured to receive parsed data (e.g., the name-value pairs) generated by data parsing unit 706, and send at least a portion of the parsed data to data point data store 710 for storage. Data point data store 710 can include a database (e.g., a relational database, an object-oriented database, or a flat file) that is configured to store location information in association with signal source identifiers.

Data harvesting unit 702 can include data filtering unit 712. Data filtering unit 712 is a component of data harvesting unit 702 that is configured to identify stale data from data point data store 710, and remove the stale data from data point data store 710. The stale data can include measurement of signals from signal sources that are determined to have moved.

Location server 112 can include location calculation unit 714. Location calculation unit 714 is a component of location server 112 that is configured to generate one or more estimated locations based on data points stored in data point data store 710 using a probability density function. Location calculation unit 714 can include histogram generation unit 716. Histogram generation unit 716 is a component of location calculation unit 714 that is configured to generate a histogram based on data points from data point data store 710. The histogram can indicate a probability of a signal source being located at each of multiple locations. Histogram generation unit 716 can generate a histogram for each signal source.

Location calculation unit 714 can include grid selection unit 718. Grid selection unit 718 is a component of location calculation unit 714 that is configured to select one or more locations ("bins") from the histogram generated by histogram generation unit 716 using a probability density function. The selection operations can include applying a multi-modal probability function.

Location calculation unit 714 can include location calculator 720. Location calculator 720 is a component of location calculation unit 714 that is configured to calculate a location of each signal source based on the selected bins, and to calculate an uncertainty of the calculated location. The calculated location can include location coordinates including a latitude coordinate, a longitude coordinate, and an altitude coordinate. The uncertainty can indicate an estimated accuracy of the calculated location.

Location calculator 720 can be configured to calculate a reach of each signal source from information associated with data points stored in data point data store 710. The reach of a signal source can indicate a maximum distance from which the signal source can be expected to be observable by a mobile device. Location calculator 720 can calculate the reach using locations in the harvested data and the calculated location.

Location calculation unit 714 can generate output including the location coordinates determined by location calculator 720. The location coordinates can be associated with an identifier of the signal source, an uncertainty, and a reach of the signal source. Location server 112 can designate the output as signal source data 410. Location server 112 can store signal source data 410 in signal source location database 114 in association with a venue. Signal source location database 114 can be a database configured to store the location coordinates of signal sources and associated information.

Location server 112 can include data distribution unit 724. Data distribution unit 724 is a component of location server 112 that is configured to retrieve signal source data 410 stored in signal source location database 114, and send the location coordinates and associated information to mobile devices 102 as coarse location data.

Location server 112 can include fingerprint engine 726. Fingerprint engine 726 can generate location fingerprint data 412 using survey data. To generate location fingerprint data 412 using survey, fingerprint engine 726 can receive the survey data, and generate the location fingerprint data based on the received survey data using interpolation for determining predicted measurements at points not sampled by sampling device 402. In some implementations, fingerprint engine 726 can generate location fingerprint data 412 using predication. Predication can include extrapolation using truth data on the signal sources. The truth data can include known locations of the signal sources relative to a venue. Fingerprint engine 726 can store generated location fingerprint data 412 in location fingerprint database 132. Data distribution unit 724 can retrieve location fingerprint data 412 stored in location fingerprint database 132 and send the location fingerprint data to mobile devices 102 upon request.

Figure 8:
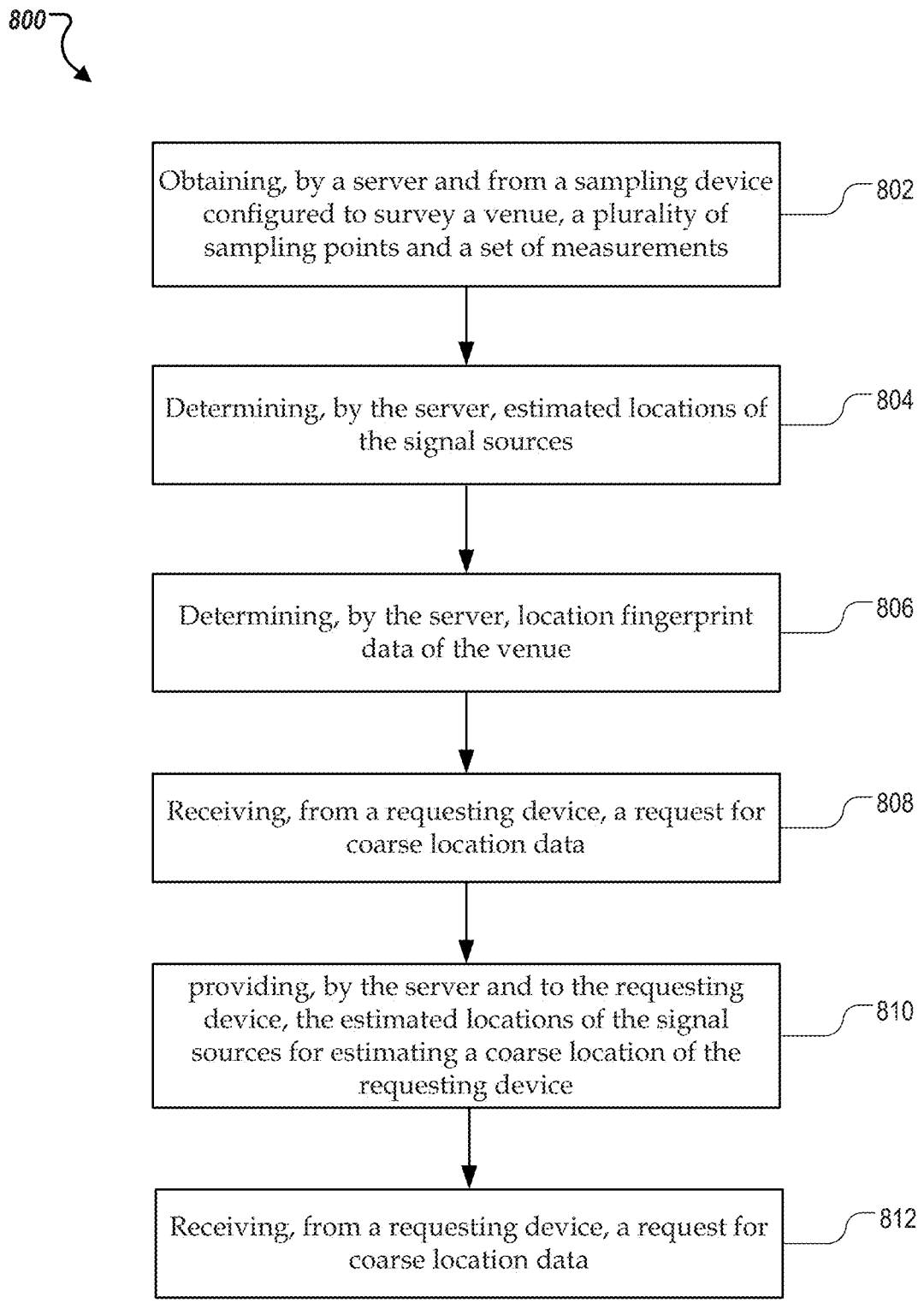
FIG. 8 is a flowchart of an exemplary procedure of generating coarse location data and location fingerprint data using survey data.

FIG. 8 is a flowchart of exemplary procedure 800 of generating coarse location data and location fingerprint data using survey data. Procedure 800 can be performed by location server 112.

Location server 112 can obtain (802), from a sampling device (e.g., sampling device 402), multiple sampling points and a set of measurements. The sampling device can be a mobile device designated to measure signals from one or more signal sources at a venue. The sampling points can be points along a route (e.g., sampling path 404) traveled by the sampling device. The sampling points can be locations at which the sampling device measures the signals using one or more sensors or receivers. The venue can include a space accessible by a pedestrian and one or more constraints of movements of the pedestrian. Each measurement can be associated with a location of a sampling point at which the sampling device measures the signals. The location can be a location relative to the venue.

Obtaining the sampling points and the set of measurements can be done in an ad hoc manner or in a prescribed manner. In some implementations, location server 112 can receive the sampling points from the sampling device. Each sampling point can be a location at the venue. A surveyor can walk at the venue with the sampling device. The sampling device can display a venue map. The venue map can include structures (e.g., hallways or offices) of the venue. The surveyor can select a current location of the surveyor on the venue map in an ad hoc manner, e.g., periodically or randomly, while the surveyor walks. When the surveyor selects a location using a selection input, the selection input can trigger the sampling device to take measurements of signals received, associate the measurements with selected location, and designate the selected location as a sampling point. For example, when the surveyor walks along a hallway and makes a turn, the surveyor can tap a turning point of the hallway as displayed in the venue map. The sampling device can take the measurements, and associate the measurements with the tapped location.

In some implementations, location server 112 can provide a prescribed route to the sampling device. The sampling device can display the route on a map of the venue. A surveyor can walk at the venue following the route. The sampling device can periodically take measurements. Each measurement can be associated with a survey timestamp. The sampling device can submit the measurements and associated survey timestamps to location server 112. Location server 112, upon receiving the survey timestamps and associated measurements, can determine the sampling points. Location server 112 can determine a location of a sampling point based on the prescribed route, a survey timestamp, and a calculated survey speed. Location server 112 can calculate the survey speed based on a beginning timestamp associated with a beginning of the route, a finishing timestamp associated with an ending of the route, and a length of the route.

Location server 112 can determine (804) estimated locations of the signal sources (signal source locations) based on the received measurements and associated sampling points using a probability density function. Determining the estimated locations can include determining a propagation characteristic of signals from each signal source based on the venue map, which can represent structures of the venue that attenuate the signals. Location server 112 can then determine one or more estimated locations for each signal source based on the received measurements, the associated sampling locations, and the propagation characteristic. Each of the one or more estimated locations can be associated with a probability that the corresponding estimated location of the signal source is located at the estimated location.

Location server 112 can determine (806) location fingerprint data of the venue. The location fingerprint data can include expected measurements of signals from the one or more signal sources at sampling points and other (unsurveyed) locations at the venue. Determining the location fingerprint data of the venue can be based on at least one of interpolation or extrapolation. Determining the location fingerprint data using interpolation can include determining the expected measurements of signals by interpolating the sampling points and a set of measurements to determine expected measurements at the other locations at the venue. Determining the location fingerprint data using extrapolation can include determining the expected measurements of signals based on known relative locations of the one or more signal sources and signal propagation characteristics of structures of the venue.

Location server 112 can receive (808), from a requesting device (e.g., mobile device 102), a request for coarse location data. The requesting device can be a mobile device requesting information for determining a venue location. The venue location can be a location of the requesting device relative to the venue. The request for coarse location data can include an identifier of at least one of the one or more signal sources. Each signal source can include a radio frequency signal transmitter. The identifier can include a MAC address of the corresponding RF signal transmitter.

Location server 112 can provide (810) to the requesting device, the estimated locations of the signal sources for estimating a coarse location of the requesting device. The requesting device can determine the coarse location, and submit the coarse location to location server 112 in a request for location fingerprint data Location server 112 can provide (812), to the requesting device for determining the venue location, a portion of the fingerprint data that corresponds to the coarse location. Providing the portion of the fingerprint data can include determining a portion of the venue that includes the coarse location. Location server 112 can then provide a portion of the fingerprint data associated with the portion of the venue to the mobile device. The requesting device can determine an estimated venue location using the portion of the location fingerprint data.

Figure 9:
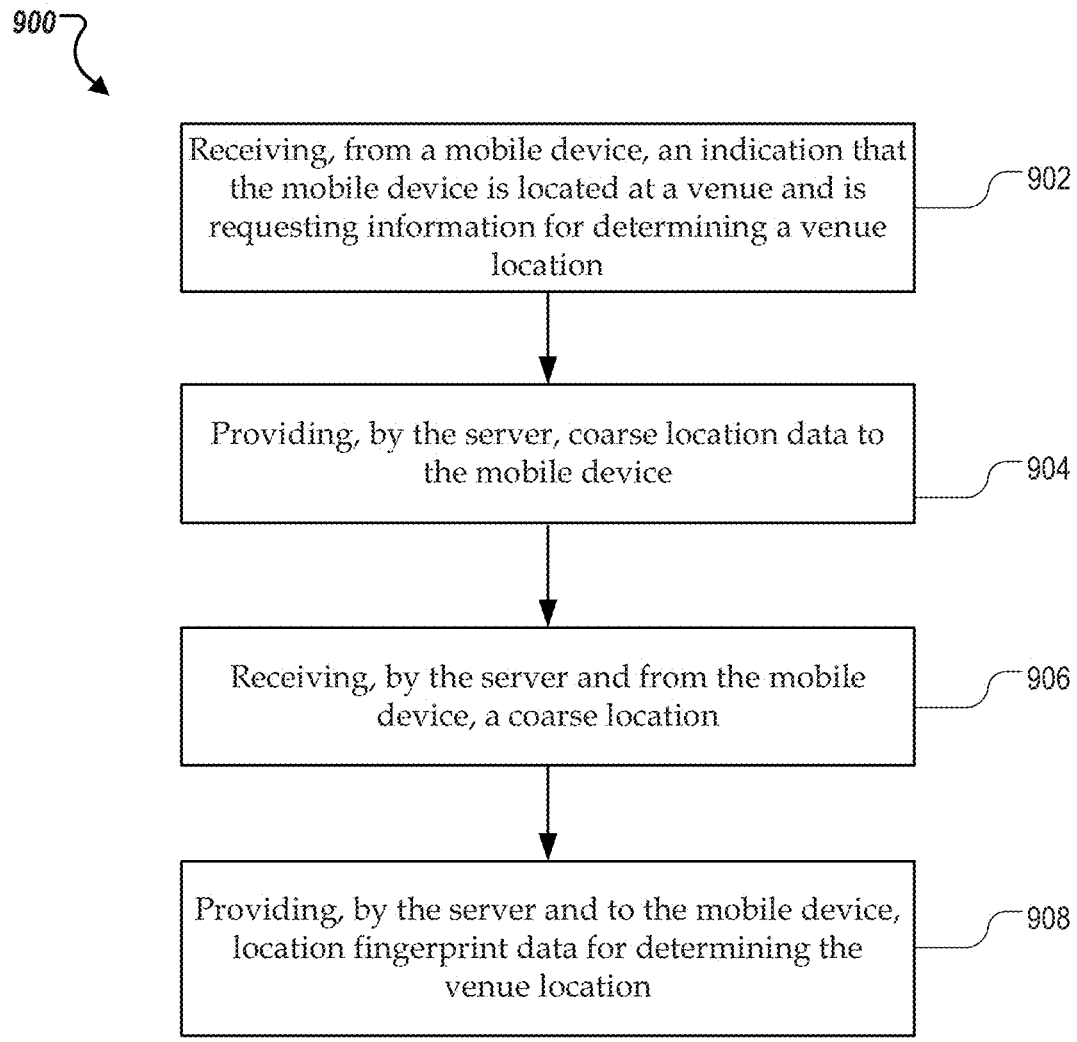
FIG. 9 is a flowchart block of an exemplary procedure of providing coarse location data and location fingerprint data to a mobile device to reduce a location search space.

FIG. 9 is a flowchart block of exemplary procedure 900 of providing coarse location data and location fingerprint data to a mobile device to reduce a location search space. Procedure 900 can be performed by location server 112.

Location server 112 can receive (902), from a mobile device (e.g., mobile device 102), an indication that the mobile device is located at a venue and is requesting information for determining a venue location of the mobile device. The indication can be a coarse location data request. The venue (e.g., an office building) can include a space accessible by a pedestrian and one or more constraints of movements of the pedestrian. The venue location can be a location of the mobile device relative to the venue (e.g., in a hallway or in a conference room).

Location server 112 can provide (904), to the mobile device, coarse location data. The coarse location data can include one or more signal source locations. Each signal source location can be an estimated location of a signal source the signal of which is estimated to be detectable by mobile devices at the venue. Each signal source can include a RF signal transmitter, e.g., a cellular transceiver or a wireless access point. The signal source can be a light source, a sound source, a magnetic field source, or a heat source. Location server 112 can determine each signal source location based on survey data using a probability density function. The survey data can include data received by location server 112 from a sampling device (e.g., sampling device 402). The sampling device being a mobile device designated to measure signals from the signal sources from multiple sampling points at the venue.

Location server 112 can receive (906), from the mobile device, a coarse location. The coarse location can be a location of the mobile device estimated by the mobile device using the coarse location data. Each measurement can include an RSSI, a round-trip time, a magnetic field strength and direction, a light intensity or spectrum, a temperature, a sound level, or an air pressure level.

Location server 112 can provide (908), to the mobile device, location fingerprint data for determining the venue location. The location fingerprint data can include a fingerprint for the coarse location. The fingerprint can include a set of one or more measurements that the mobile device is expected to receive when the mobile device measures signals of the one or more signal sources at the coarse location. In addition, the location fingerprint data can include multiple of fingerprints, each fingerprint corresponding to a tile. Each tile can be an area of the venue. At least one tile of the tiles can be an area corresponding to (e.g., enclosing) the coarse location. At least one other tile of the tiles can be an area neighboring the first tile.

Exemplary System Architecture

Figure 10:
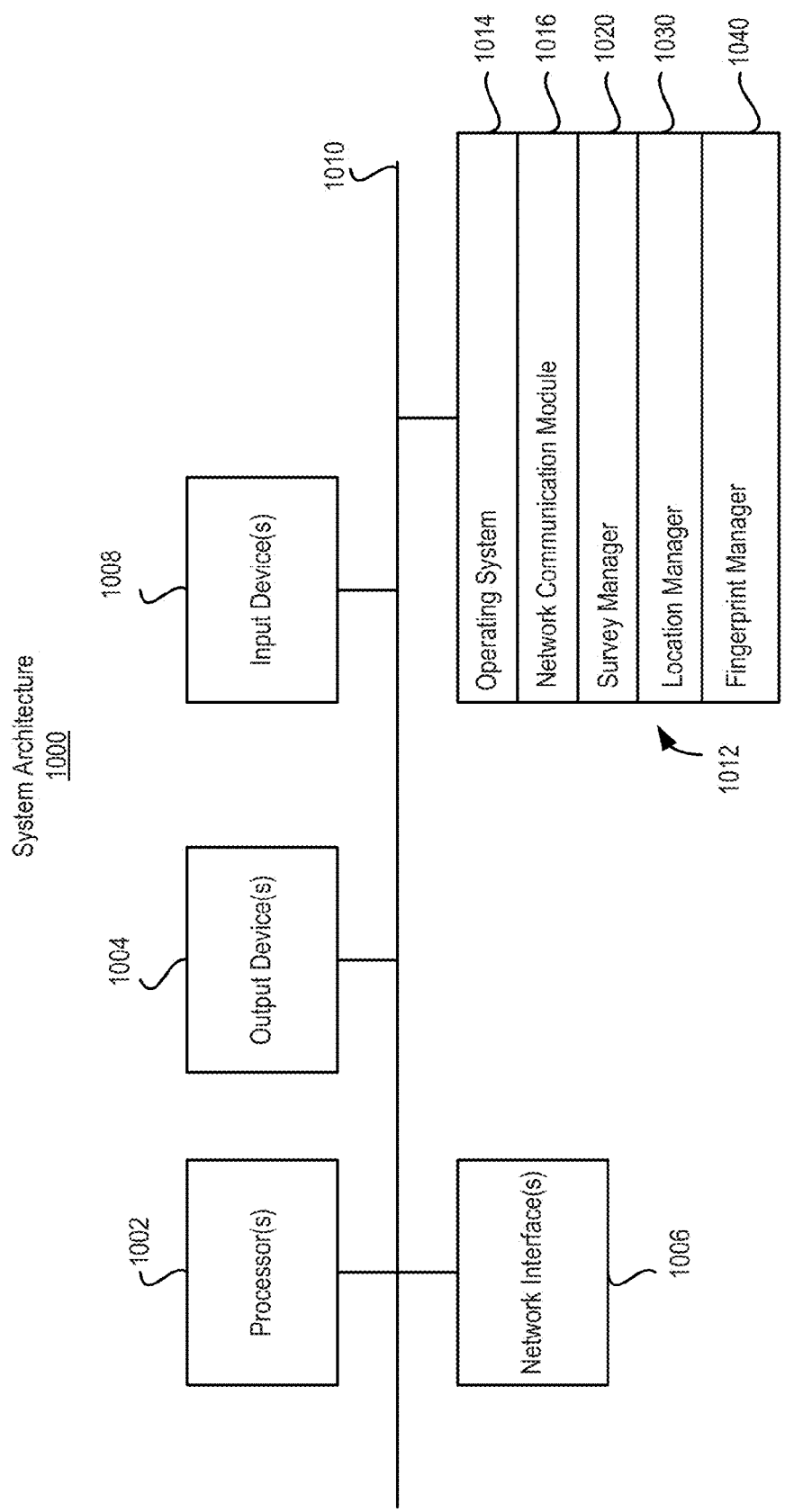
FIG. 10 is a block diagram of an exemplary system architecture for implementing the features and operations of FIGS. 1-9.

FIG. 10 is a block diagram of an exemplary system architecture for implementing the features and operations of FIGS. 1-9. Other architectures are possible, including architectures with more or fewer components. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows® NT server), network communication module 1016, survey manager 1020, location manager 1030, and fingerprint manager 1040. Survey manager 1020 can include instructions for causing processor 1002 to perform functions of data harvesting unit 702 (of FIG. 7), as well as functions of providing venue maps and sampling routes to sampling devices. Location manager 1030 can include instructions for causing processor 1002 to perform functions of location calculation unit 714. Fingerprint manager 1040 can include instructions for causing processor 1002 to perform functions of fingerprint engine 726. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.).

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Exemplary Mobile Device Architecture

Figure 11:
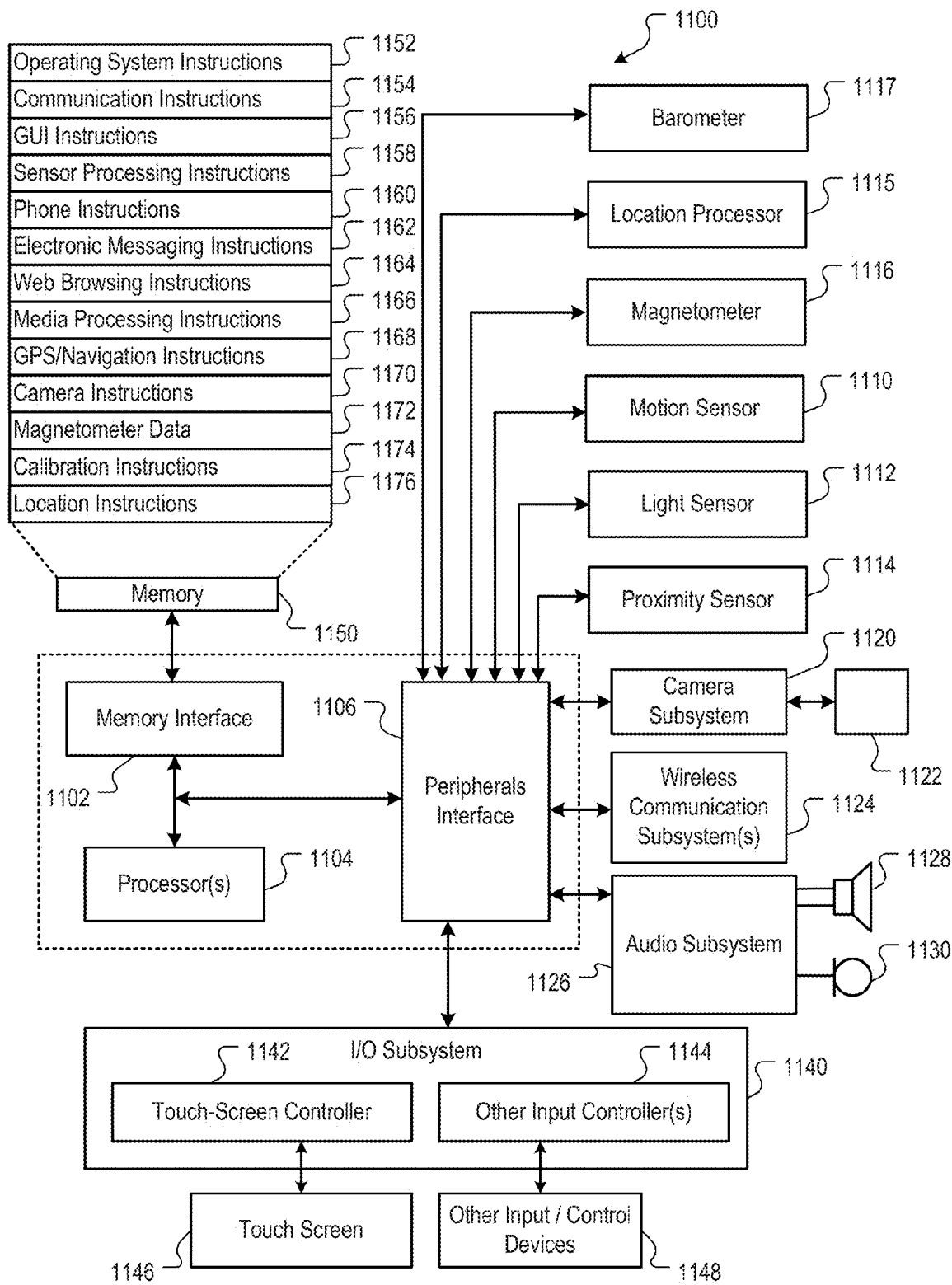
FIG. 11 is a block diagram illustrating an exemplary device architecture of a mobile device implementing the features and operations described in reference to FIGS. 1-9.

FIG. 11 is a block diagram of an exemplary architecture 1100 for the mobile devices of FIGS. 1-9. A mobile device (e.g., mobile device 102) can include memory interface 1102, one or more data processors, image processors and/or processors 1104, and peripherals interface 1106. Memory interface 1102, one or more processors 1104 and/or peripherals interface 1106 can be separate components or can be integrated in one or more integrated circuits. Processors 1104 can include application processors, baseband processors, and wireless processors. The various components in mobile device 102, for example, can be coupled by one or more communication buses or signal lines.

Sensors, devices, and subsystems can be coupled to peripherals interface 1106 to facilitate multiple functionalities. For example, motion sensor 1110, light sensor 1112, and proximity sensor 1114 can be coupled to peripherals interface 1106 to facilitate orientation, lighting, and proximity functions of the mobile device. Location processor 1115 (e.g., GPS receiver) can be connected to peripherals interface 1106 to provide geopositioning. Electronic magnetometer 1116 (e.g., an integrated circuit chip) can also be connected to peripherals interface 1106 to provide data that can be used to determine the direction of magnetic North. Thus, electronic magnetometer 1116 can be used as an electronic compass. Motion sensor 1110 can include one or more accelerometers configured to determine change of speed and direction of movement of the mobile device. Barometer 1117 can include one or more devices connected to peripherals interface 1106 and configured to measure pressure of atmosphere around the mobile device.

Camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which a mobile device is intended to operate. For example, a mobile device can include communication subsystems 1124 designed to operate over a GSM network, a GPRS network, an EDGE network, a Wi-Fi™ or WiMax™ network, and a Bluetooth™ network. In particular, the wireless communication subsystems 1124 can include hosting protocols such that the mobile device can be configured as a base station for other wireless devices.

Audio subsystem 1126 can be coupled to a speaker 1128 and a microphone 1130 to facilitate voice-enabled functions, such as voice recognition, voice replication, digital recording, and telephony functions. Audio subsystem 1126 can be configured to receive voice commands from the user.

I/O subsystem 1140 can include touch surface controller 1142 and/or other input controller(s) 1144. Touch surface controller 1142 can be coupled to a touch surface 1146 or pad. Touch surface 1146 and touch surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1146. Touch surface 1146 can include, for example, a touch screen.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of speaker 1128 and/or microphone 1130.

In one implementation, a pressing of the button for a first duration may disengage a lock of the touch surface 1146; and a pressing of the button for a second duration that is longer than the first duration may turn power to mobile device 102 on or off. The user may be able to customize a functionality of one or more of the buttons. The touch surface 1146 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 1102 can be coupled to memory 1150. Memory 1150 can include high-speed random access memory and/or non-volatile memory, such as one or more magnetic disk storage devices, one or more optical storage devices, and/or flash memory (e.g., NAND, NOR). Memory 1150 can store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can include a kernel (e.g., UNIX kernel).

Memory 1150 may also store communication instructions 1154 to facilitate communicating with one or more additional devices, one or more computers and/or one or more servers. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes and instructions; camera instructions 1170 to facilitate camera-related processes and functions; magnetometer data 1172 and calibration instructions 1174 to facilitate magnetometer calibration. The memory 1150 may also store other software instructions (not shown), such as security instructions, web video instructions to facilitate web video-related processes and functions, and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1150. Memory 1150 can store state instructions 1176 that, when executed, can cause processor 1104 to perform operations of location subsystem 500 as described above in reference to FIG. 5.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of the mobile device may be implemented in hardware and/or in software, including in one or more signal processing and/or application specific integrated circuits.

Exemplary Operating Environment

Figure 12:
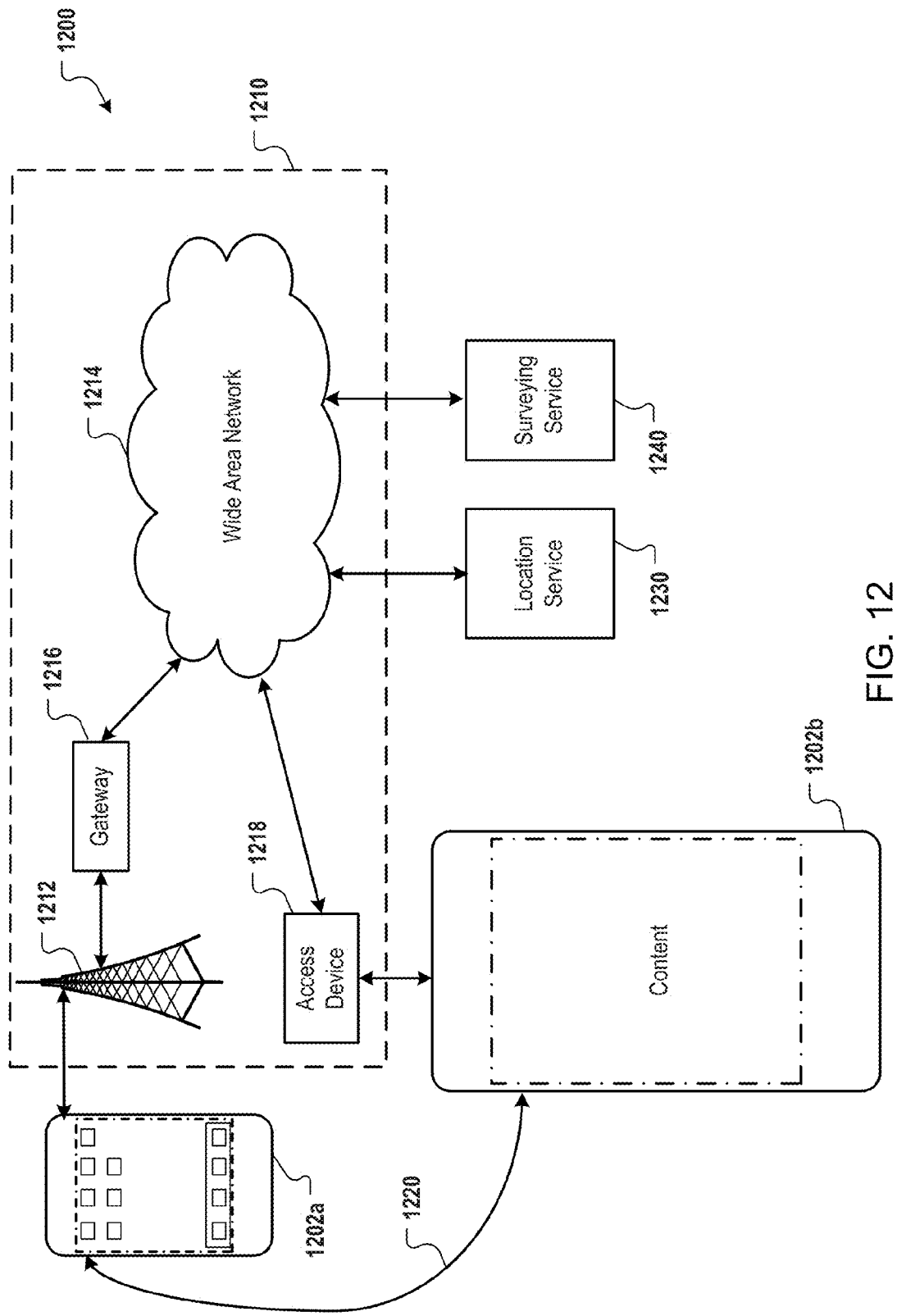
FIG. 12 is a block diagram of an exemplary network operating environment for the mobile devices of FIGS. 1-9.

FIG. 12 is a block diagram of an exemplary network operating environment 1200 for the mobile devices of FIGS. 1-9. Mobile devices 1202*a* and 1202*b* can, for example, communicate over one or more wired and/or wireless networks 1210 in data communication. For example, a wireless network 1212, e.g., a cellular network, can communicate with a wide area network (WAN) 1214, such as the Internet, by use of a gateway 1216. Likewise, an access device 1218, such as an 802.11g wireless access point, can provide communication access to the wide area network 1214.

In some implementations, both voice and data communications can be established over wireless network 1212 and the access device 1218. For example, mobile device 1202*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1212, gateway 1216, and wide area network 1214 (e.g., using Transmission Control Protocol/Internet Protocol (TCP/IP) or User Datagram Protocol (UDP)). Likewise, in some implementations, the mobile device 1202*b* can place and receive phone calls, send and receive e-mail messages, and retrieve electronic documents over the access device 1218 and the wide area network 1214. In some implementations, mobile device 1202*a* or 1202*b* can be physically connected to the access device 1218 using one or more cables and the access device 1218 can be a personal computer. In this configuration, mobile device 1202*a* or 1202*b* can be referred to as a "tethered" device.

Mobile devices 1202*a* and 1202*b* can also establish communications by other means. For example, wireless device 1202*a* can communicate with other wireless devices, e.g., other mobile devices, cell phones, etc., over the wireless network 1212. Likewise, mobile devices 1202*a* and 1202*b* can establish peer-to-peer communications 1220, e.g., a personal area network, by use of one or more communication subsystems, such as the Bluetooth™ communication devices. Other communication protocols and topologies can also be implemented.

The mobile device 1202*a* or 1202*b* can, for example, communicate with one or more services 1230 and 1240 over the one or more wired and/or wireless networks. For example, one or more location services 1230 can provide coarse location data and location fingerprint data to mobile devices 1202*a* and 1202*b*, provide updates of coarse location data and the location fingerprint data, and provide algorithms for determining a coarse location and a venue location of mobile devices 1202*a* and 1202*b*. Venue map service 1240 can provide map information to mobile devices 1202*a* and 1202*b*. The map information can include venue maps of internal structures of buildings. Venue map service 1240 can provide a venue map for a venue to mobile devices 1202*a* and 1202*b* when mobile devices 1202*a* and 1202*b* are located at the venue or are approaching the venue.

Mobile device 1202*a* or 1202*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 1202*a* or 1202*b*. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   receiving, by a server and from a mobile device, an indication that the mobile device is located at a venue and is requesting information for determining a venue location of the mobile device, the venue comprising a space accessible by a pedestrian and one or more constraints of movements of the pedestrian, the venue location being a location of the mobile device relative to the venue, wherein the indication includes one or more identifiers of one or more signal sources detected by the mobile device at the venue location;
   providing, by the server, coarse location data to the mobile device based on the one or more identifiers, the coarse location data including one or more actual or estimated locations of the one or more signal sources;
   receiving, by the server and from the mobile device, a coarse location, the coarse location being a location of the mobile device estimated by the mobile device using the coarse location data; and
   providing, by the server and to the mobile device, location fingerprint data for determining the venue location, the location fingerprint data comprising a fingerprint for the coarse location, the fingerprint including a set of one or more measurements that the mobile device is expected to receive when the mobile device measures signals of the one or more signal sources at the coarse location, wherein the server comprises one or more processors.

2. The method of claim 1, wherein each signal source includes at least one of a cellular transceiver, a wireless access point, a light source, a sound source, a magnetic field source, or a heat source.

3. The method of claim 1, wherein each measurement includes at least one of a received signal strength indication (RSSI), a round-trip time, a magnetic field strength, a temperature, a sound level, or an air pressure level.

4. The method of claim 1, wherein each estimated location is determined based on survey data using a probability density function, the survey data include data received by the server from a sampling device, the sampling device being a mobile device designated to measure signals from the signal sources from a plurality of sampling points at the venue.

5. The method of claim 1, wherein the location fingerprint data comprises a plurality of fingerprints, each fingerprint corresponding to a tile, each tile being an area of the venue, at least one first tile of the tiles being an area corresponding to the coarse location, and at least one second tile of the tiles being an area neighboring the first tile.

6. A method, comprising:
   submitting, by a mobile device and to a server, a request for coarse location data, the request for coarse location data comprising an identifier of each of one or more signal sources detected by the mobile device;
   receiving, by the mobile device and from the server, coarse location data, the coarse location data comprising an estimated location of each signal source;
   determining, by the mobile device, a coarse location of the mobile device based on a measurement of signals from the one or more signal sources and a function of a signal source uncertainty and the measurement;
   submitting, by the mobile device and to the server, a request for location fingerprint data, the request for location fingerprint data identifying the coarse location;
   receiving, by the mobile device and from the server, the location fingerprint data associated with at least of a portion of a venue that includes the coarse location, the location fingerprint data comprising expected measurements of signal of each signal source; and
   determining, by the mobile device, an estimated location of the mobile device based on statistical classification of a measurement of the signals from each signal source using the location fingerprint data.

7. The method of claim 6, wherein:
   the estimated location of each signal source is determined based on a multi-modal probability function applied to survey data, the survey data being provided by a sampling device measuring signals from the signal source at the venue.

8. The method of claim 6, wherein the location fingerprint data comprises training data generated based on one or more previously conducted surveys of the venue.

9. The method of claim 6, wherein the function comprises a weighted average of measurements of signals from the one or more signal sources.

10. The method of claim 9, wherein:
    each of the one or more signal sources is a radio frequency signal transmitter, and the measurements include signal strengths or round trip time.

11. A non-transitory storage device storing computer instructions operable to cause a server to perform operations comprising:
    receiving, from a mobile device, an indication that the mobile device is located at a venue and is requesting information for determining a venue location of the mobile device, the venue comprising a space accessible by a pedestrian and one or more constraints of movements of the pedestrian, the venue location being a location of the mobile device relative to the venue, wherein the indication includes one or more identifiers of one or more signal sources detected by the mobile device at the venue location;

providing location data to the mobile device based on the one or more identifiers, the coarse location data including one or more actual or estimated locations of the one or more signal sources;

receiving, from the mobile device, a coarse location, the coarse location being a location of the mobile device estimated by the mobile device using the coarse location data; and providing, to the mobile device, location fingerprint data for determining the venue location, the location fingerprint data comprising a fingerprint for the coarse location, the fingerprint including a set of one or more measurements that the mobile device is expected to receive when the mobile device measures signals of the one or more signal sources at the coarse location, wherein the server comprises one or more processors.

12. The non-transitory storage device of claim 11, wherein:
each signal source includes at least one of a cellular transceiver, a wireless access point, a light source, a sound source, a magnetic field source, or a heat source; and
each measurement includes at least one of a received signal strength indication (RSSI), a round-trip time, a magnetic field strength, a temperature, a sound level, or an air pressure level.

13. The non-transitory storage device of claim 11, wherein each estimated location is determined based on survey data using a probability density function, the survey data include data received by the server from a sampling device, the sampling device being a mobile device designated to measure signals from the signal sources from a plurality of sampling points at the venue.

14. The non-transitory storage device of claim 11, wherein the location fingerprint data comprises a plurality of fingerprints, each fingerprint corresponding to a tile, each tile being an area of the venue, at least one first tile of the tiles being an area corresponding to the coarse location, and at least one second tile of the tiles being an area neighboring the first tile.

15. A non-transitory storage device storing computer instructions operable to cause a mobile device to perform operations comprising:
submitting, by the mobile device and to a server, a request for coarse location data, the request for coarse location data comprising an identifier of each of one or more signal sources detected by the mobile device;
receiving, by the mobile device and from the server, coarse location data, the coarse location data comprising an estimated location of each signal source;
determining, by the mobile device, a coarse location of the mobile device based on a measurement of signals from the one or more signal sources and a function of a signal source uncertainty and the measurement;
submitting, by the mobile device and to the server, a request for location fingerprint data, the request for location fingerprint data identifying the coarse location;
receiving, by the mobile device and from the server, the location fingerprint data associated with at least of a portion of a venue that includes the coarse location, the location fingerprint data comprising expected measurements of signal of each signal source; and
determining, by the mobile device, an estimated location of the mobile device based on statistical classification of a measurement of the signals from each signal source using the location fingerprint data.

16. The non-transitory storage device of claim 15, wherein:
the estimated location of each signal source is determined based on a multi-modal probability function applied to survey data, the survey data being provided by a sampling device measuring signals from the signal source at the venue.

17. A system, comprising:
a server comprising one or more processors; and
a non-transitory storage device storing computer instructions operable to cause the server to perform operations comprising:
receiving, from a mobile device, an indication that the mobile device is located at a venue and is requesting information for determining a venue location of the mobile device, the venue comprising a space accessible by a pedestrian and one or more constraints of movements of the pedestrian, the venue location being a location of the mobile device relative to the venue, wherein the indication includes one or more identifiers of one or more signal sources detected by the mobile device at the venue location;
providing, by the server, coarse location data to the mobile device based on the one or more identifiers, the coarse location data including one or more actual or estimated locations of the one or more signal sources;
receiving, from the mobile device, a coarse location, the coarse location being a location of the mobile device estimated by the mobile device using the coarse location data; and
providing, to the mobile device, location fingerprint data for determining the venue location, the location fingerprint data comprising a fingerprint for the coarse location, the fingerprint including a set of one or more measurements that the mobile device is expected to receive when the mobile device measures signals of the one or more signal sources at the coarse location.

18. The system of claim 17, wherein:
each signal source includes at least one of a cellular transceiver, a wireless access point, a light source, a sound source, a magnetic field source, or a heat source; and
each measurement includes at least one of a received signal strength indication (RSSI), a round-trip time, a magnetic field strength, a temperature, a sound level, or an air pressure level.

19. The system of claim 17, wherein each estimated location is determined based on survey data using a probability density function, the survey data include data received by the server from a sampling device, the sampling device being a mobile device designated to measure signals from the signal sources from a plurality of sampling points at the venue.

20. The system of claim 17, wherein the location fingerprint data comprises a plurality of fingerprints, each fingerprint corresponding to a tile, each tile being an area of the venue, at least one first tile of the tiles being an area corresponding to the coarse location, and at least one second tile of the tiles being an area neighboring the first tile.

21. A mobile device, comprising:
one or more processors; and
a non-transitory storage device storing computer instructions operable to cause the one or more processors to perform operations comprising:
submitting, to a server, a request for coarse location data, the request for coarse location data comprising an identifier of each of one or more signal sources detected by the mobile device;

receiving, from the server, coarse location data, the coarse location data comprising an estimated location of each signal source;

determining, a coarse location of the mobile device based on a measurement of signals from the one or more signal sources and a function of a signal source uncertainty and the measurement;

submitting, to the server, a request for location fingerprint data, the request for location fingerprint data identifying the coarse location;

receiving, from the server, the location fingerprint data associated with at least of a portion of a venue that includes the coarse location, the location fingerprint data comprising expected measurements of signal of each signal source; and determining, an estimated location of the mobile device based on statistical classification of a measurement of the signals from each signal source using the location fingerprint data.

22. The mobile device of claim 21, wherein:
the estimated location of each signal source is determined based on a multi-modal probability function applied to survey data, the survey data being provided by a sampling device measuring signals from the signal source at the venue.

* * * * *